(12) United States Patent
Shirase et al.

(10) Patent No.: US 6,778,051 B2
(45) Date of Patent: Aug. 17, 2004

(54) ELECTROMAGNETIC VALVE

(75) Inventors: Takaomi Shirase, Nagano-ken (JP); Naoki Masuda, Nagano-ken (JP)

(73) Assignee: Nissin Kogyo., Ltd., Nagano-Ken (JP)

( * ) Notice: Subject to any disclaimer, the term of this patent is extended or adjusted under 35 U.S.C. 154(b) by 0 days.

(21) Appl. No.: 10/655,299

(22) Filed: Sep. 5, 2003

(65) Prior Publication Data

US 2004/0051609 A1 Mar. 18, 2004

(30) Foreign Application Priority Data

Sep. 17, 2002 (JP) .................................... P.2002-269459

(51) Int. Cl.$^7$ ................................................ H01F 7/00
(52) U.S. Cl. .................. 335/278; 335/281; 251/129.01; 251/129.15
(58) Field of Search ................................ 335/255, 260, 335/278, 281; 251/129.01, 129.14, 129.15

(56) References Cited

U.S. PATENT DOCUMENTS

| | | | |
|---|---|---|---|
| 5,542,755 A | 8/1996 | Staib et al. | |
| 5,683,151 A | 11/1997 | Friedow et al. | |
| 6,199,776 B1 | * 3/2001 | Andorfer | ................. 239/585.4 |
| 6,405,752 B1 | 6/2002 | Fritsch et al. | |

FOREIGN PATENT DOCUMENTS

| | | |
|---|---|---|
| DE | 199 21 875 A1 | 11/2000 |
| DE | 100 64 169 A1 | 2/2002 |
| JP | 9-506309 | 6/1997 |
| JP | 10 184933 | 7/1998 |
| JP | 3236540 | 9/2001 |

OTHER PUBLICATIONS

European Search Report dated Nov. 25, 2003.

* cited by examiner

*Primary Examiner*—Ramon M. Barrera
(74) *Attorney, Agent, or Firm*—McGuireWoods LLP

(57) ABSTRACT

An electromagnetic valve has: a coil unit including a bobbin around which a coil winding is wound, the bobbin having a central hole; a pipe body in which a fixed core is press-fitted and welded; and a valve operating unit with the pipe body inserted in the central hole of the bobbin at an one end thereof, a valve of the valve operating unit being opened or closed when the coil unit is energized, wherein, in an inserted portion of the pipe body opposed to the central hole of the bobbin, a welding portion in which a fixed core is welded is formed in a thin-wall sectional shape reduced only an outer diameter thereof, and a difference in the outer diameter between the welding portion and the inserted portion serves to absorb the swelling of a bead due to the welding.

6 Claims, 3 Drawing Sheets

ELECTROMAGNETIC VALVE

BACKGROUND OF THE INVENTION

1. Field of the Invention

The present invention relates to an electromagnetic valve which is installed in a fluid pressure circuit for e.g. an anti-lock braking device.

2. Description of the Related Art

The electromagnetic valve as an electromagnetic driving component is generally provided with a coil unit with a coil winding wound around a bobbin and a valve operating unit for opening/closing the valve by passing a current through or energizing the coil unit. Such an electromagnetic valve includes a normally-closed electromagnetic valve which is normally closed but opened when the valve operating unit is operated by energizing the coil unit, and a normally opened electromagnetic valve which is normally opened but closed when the valve operating unit is operated by passing a current through the coil unit. These electromagnetic valves are selectively employed according a purpose and use.

A normally-closed electromagnetic valve has been proposed which is used for a braking device for a motor vehicle. For example, the normally-closed electromagnetic valve is fit in a guide sleeve with an air gap remaining between a magnetic core (fixed core) and a movable piece (movable core) and coupled with the guide sleeve by a ring-shaped welding portion. The solenoid coil is designed to open when the movable piece is moved by energizing a solenoid coil fit outside the magnetic core (see JP-W-9-506309).

Otherwise, another electromagnetic valve structure has been proposed in which a sleeve is arranged on the inner periphery of a solenoid coil, an armature core is fixed to the one end of the sleeve whereas an valve seat is fixed to the other end of the sleeve. A movable seat which is normally urged is seated between the armature core and valve seat. In this electromagnetic valve structure, the one end of the sleeve which is inserted in the solenoid coil and welded to the armature core is tapered to improve the combining capability with a valve body (see Japanese Patent No. 3236540)

In the normally-closed electromagnetic valve disclosed in the JP-W-9-506309, the magnetic core (fixed core) is press-fitted into the one end of the guide sleeve inserted in the solenoid coil and fixed by welding. A bead of welding is therefore formed so as to swell on the outer periphery of the guide sleeve. Due to the bead, a gap between the guide sleeve and the coil bobbin is created, so that the solenoid coil is large-scaled.

Further, in the electromagnetic valve structure disclosed in the Japanese Patent No. 3236540, the one end of the sleeve welded to the armature core inserted in the solenoid coil is tapered. The electromagnetic valve structure must be therefore assembled in such a manner that from the one end of the sleeve, the armature core is press-fitted whereas from the other end of the sleeve, a compressed coil spring, movable piece, valve seat, etc. are inserted. In this way, the electromagnetic valve structure is assembled from both ends of the sleeve so that the assembling process becomes complicate.

SUMMARY OF THE INVENTION

An object of this invention is to solve the problem of the above prior arts and to provide an electromagnetic valve which does not excessively large-scale electromagnetic driving components to improve assembling capability.

In order to solve the above problems, this invention has the following constructions.

According to a first aspect of the present invention, it is provided that an electromagnetic valve having: a coil unit including a bobbin around which a coil winding is wound, the bobbin having a central hole; a pipe body in which a fixed core is press-fitted and welded; and a valve operating unit with the pipe body inserted in the central hole of the bobbin at an one end thereof, a valve of the valve operating unit being opened or closed when the coil unit is energized, wherein, in an inserted portion of the pipe body opposed to the central hole of the bobbin, a welding portion in which a fixed core is welded is formed in a thin-wall sectional shape reduced only an outer diameter thereof, and a difference in the outer diameter between the welding portion and the inserted portion serves to absorb the swelling of a bead due to the welding.

According to a second aspect of the present invention, it is provided that the electromagnetic valve according to the first aspect further having: a movable core mounted in the pipe body in such a manner that a spring is interposed between the movable core and the fixed core, and including a valve body disposed at a tip of the movable core; and a valve seating member mounted in the other end of the pipe body, wherein the valve body is always seated at a valve seating member thereby closing the valve, and when the coil unit is energized, the movable core is sucked toward the fixed core against the urging by the spring, thereby opening the valve.

According to a third aspect of the present invention, it is provided that the electromagnetic valve according to the second aspect, wherein a bottom edge portion is integrally formed at the other end of the pipe body against which the end of the valve seating member is hit.

According to a fourth aspect of the present invention, it is provided that the electromagnetic valve according to the first aspect, wherein a pipe body including a top portion and mounting a movable core in vicinity of the top portion, the fixed core mounting a valve seating member and a valve shaft, the valve shaft including a valve body disposed at a tip thereof and disposed in such a manner that a spring is interposed between the valve shaft and the valve seating member, the rear end of the valve shaft is kept in contact with a movable core in such a manner that the valve body is always apart from the valve seating member, thereby opening the valve, and when the coil unit is energized, the movable core is sucked toward the fixed core so that the rear end of the valve shaft is pushed against the urging by the spring, thereby closing the valve.

According to a fifth aspect of the present invention, it is provided that the electromagnetic valve according to the first aspect, wherein an inner diameter of the inserted portion of the pipe body is constant.

According to a sixth aspect of the present invention, it is provided that the electromagnetic valve according to the first aspect, wherein the welding portion formed in the thin-wall sectional shape includes tapered portions so as to form a concave groove.

DETAILED DESCRIPTION OF THE PREFERRED EMBODIMENTS

Figure 1:
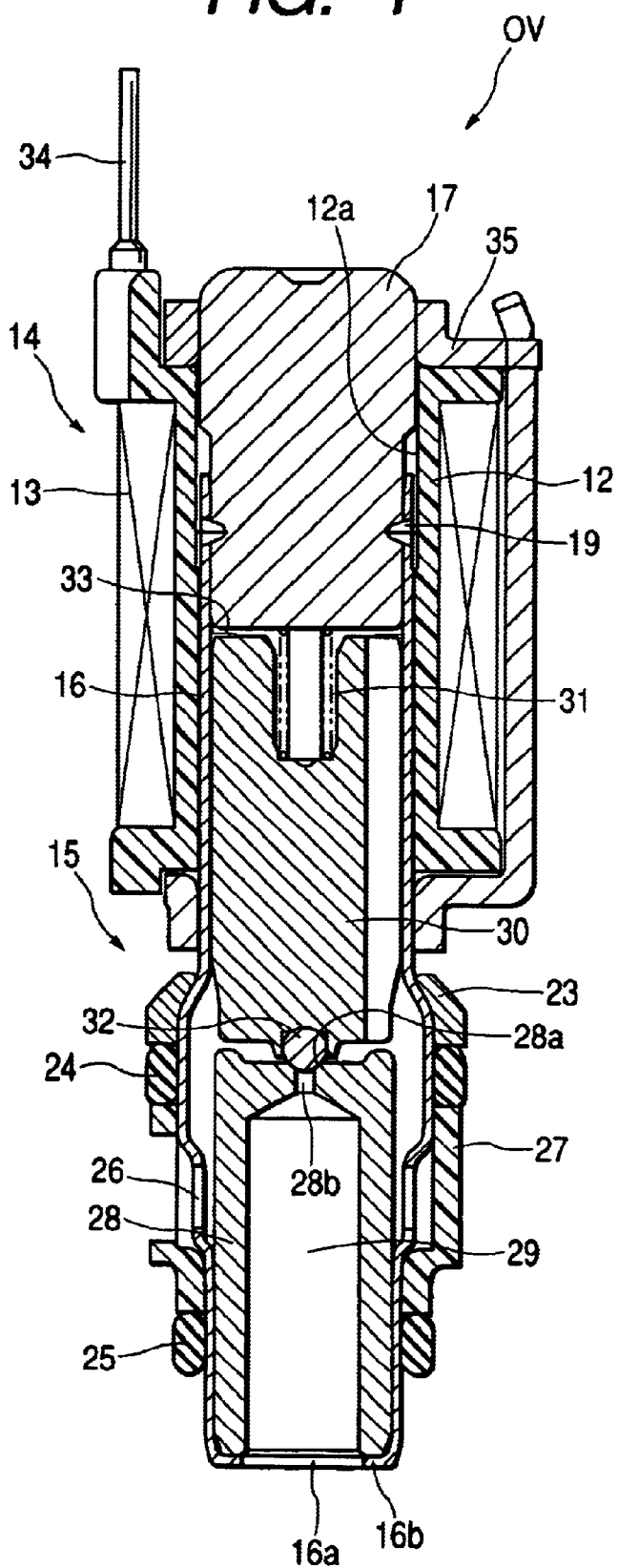
FIG. 1 is a view for explaining the section of a normally-closed electromagnetic valve.

Now referring to the drawings, a detailed explanation will be given of preferred embodiments of this invention.

These embodiments directed to exemplary electromagnetic valves which are installed in a fluid pressure circuit for e.g. an anti-lock braking device for use in a motor vehicle.

Figure 2A:
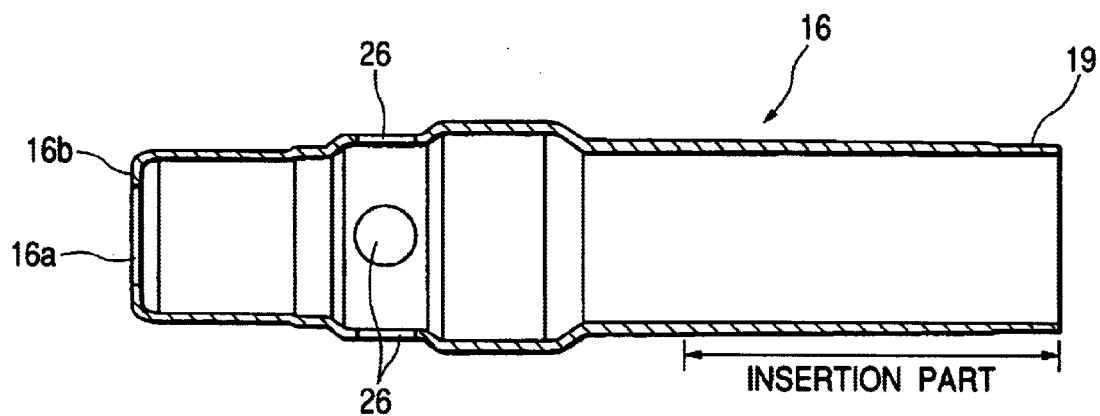
FIGS. 2A to 2D are a view for explaining the section of a pipe body and views for explaining the welding portion of the pipe body.
Figure 2B:
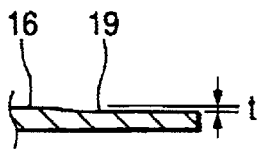
Figure 2C:
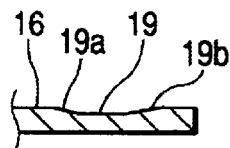
Figure 2D:
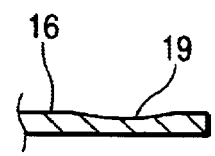
Figure 3:
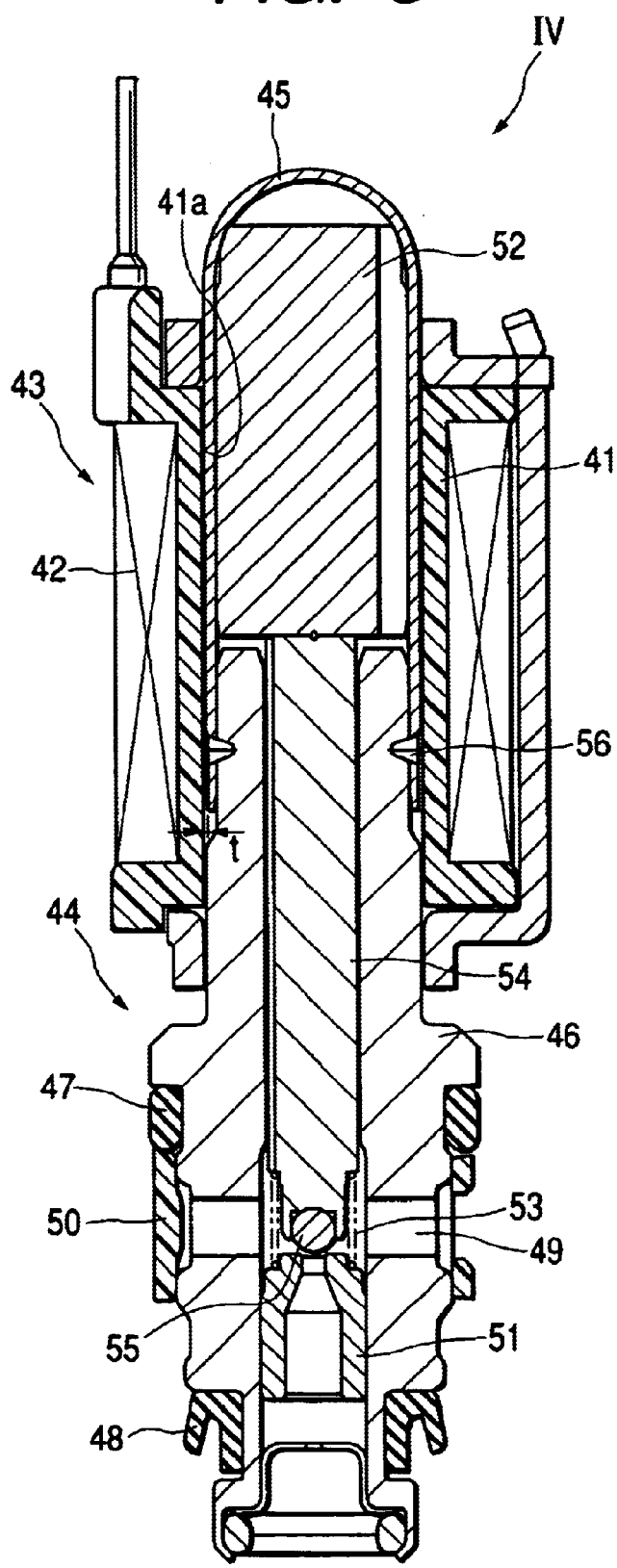
FIG. 3 is a view for explaining the section of a normally-opened electromagnetic valve.

FIG. 1 is a sectional view of a normally-closed electromagnetic valve. FIG. 2A is a sectional view of a pipe body. FIGS. 2B to 2D are views for explaining a welding portion of the pipe body. FIG. 3 is a sectional view of a normally-opened electromagnetic valve.

First, referring to FIG. 1, a schematic structure of the normally-closed electromagnetic valve OV will be explained. Incidentally, although for example, four normally-closed electromagnetic valves OV are installed in a modulator body (not shown), one of them will be explained below. The normally-closed electromagnetic valve OV includes a coil unit 14 with a coil winding 13 wound around a bobbin 12 and a valve operating unit 15 with a pipe body 16 inserted in a central hole 12a of the bobbin.

The configuration of the valve operating unit 15 will be explained. A fixed core 17 is press-fitted into an opening of the one end of the pipe body 16 and fixed from the outer periphery by welding. The one end of the pipe body 16 with the fixed core 17 welded is inserted into the central hole 12a of the bobbin 12 of the coil unit 14. The other end of the pipe body 16 is fit in a fitting hole of the modulator body and stopped to drop out by a C ring (not shown) in contact with a plug 23 fit over the outer periphery of the pipe body 16.

Further, seal rings 24 and 25 are fit over the outer periphery of the pipe body 16 in its longitudinal direction. In the pipe body 16 corresponding to the area axially partitioned by these seal rings 24 and 25, a communicating hole 26 is formed so as to communicate with a liquid path of the modulator body. A filter device 27 is fit over the communicating hole 26 so that the braking liquid flowing inward of the pipe body 16 is filtered. A valve hole 28b is formed at a seating portion 28a of a valve seat member 28 accommodated in the other end of the pipe body 16. The valve hole 28b is communicated with a liquid chamber 29 arranged at the center in the axial direction of the valve seat member 28. The liquid chamber 29 is communicated with the liquid path of the modulator body through a communicating hole 16a provided at the other end of the pipe body 16.

The valve seat member 28 is press-fitted in the other end of the pipe body 16. At the other end of the pipe body 16, a bottom edge portion 16b is formed, and the communicating hole 16a is surrounded by the bottom edge portion 16b. The end of the valve seat member 28 is hit against and pressed into the bottom edge portion 16b. This bottom edge portion 16b serves to enhance the rigidity of the pipe body 16.

A movable core 30 is mounted with a return spring 31 interposed between the movable core 30 and the fixed core 17 press-fitted in the one end of the pipe body 16. A valve body (e.g. steel ball) located at the tip of the movable core 30 is always seated at a seating portion 28a of the valve seating member 28 accommodated at the other end of the pipe body 16, thereby closing the valve.

The movable core 30 is always urged by the return spring 31 in the direction of closing the valve. The valve body 32 provided at the tip of the movable core 30 is always kept in contact with the valve seat member 28 to interrupt the liquid chamber 29. On the end face (upper end surface) of the movable core 30 abutting on the fixed core 17, a shutting plate 33 is provided. When the coil unit 14 is energized, the movable core 30 is sucked toward the fixed core 17 against the urging by the return spring 31 and the valve body 32 leaves the valve seating member 28, thereby opening the valve.

Further, the coil unit 14 has a conductive connecting terminal 34 secured to the one side of the bobbin 12 of an insulating resin material in a suspending direction from the bobbin 12 so as not to drop out. The connecting terminal 34 is connected to the coil winding 13 wound around the bobbin 12. A yoke 35 is fit over the outer periphery of the bobbin 12 to form a magnetic path. In the central hole 12a of the bobbin 12, the one end of the pipe body 16 and the fixed core 17 pressed into the one end thereof are inserted.

Referring to FIGS. 2A to 2D, an explanation will be given of the shape of the pipe body 16. In FIGS. 2A, 2B, of the inserted portion of the pipe body 16 with the one end inserted in the central hole 12a of the bobbin 12, the welding portion 19 in which the fixed core 17 is press-fitted and welded is formed in a thin-wall sectional reducing only the outer diameter thereof. In FIG. 2B, the welding potion 19 is formed in a thin-wall sectional shape reducing only the outer diameter thereof toward the one end of the pipe body 16. A difference $t$ in the outer diameter between the welding portion 19 and the inserted portion serves to absorb the height (swelling of the welded metal toward the outer periphery) of the bead when the fixed core 17 is welded.

In this way, the welding potion 19, which is formed at the inserted portion of the pipe body 16 inserted in the central hole 12a of the bobbin 12, is formed in a thin-wall sectional shape reducing only the outerdiameter thereof. For this reason, the internal diameter of the bobbin 12 is not excessively increased taking the swelling of the bead into consideration, thereby down-sizing the coil unit 14 as compared with the conventional electromagnetic valve.

Further, since the bottom edge portion 16b is formed around the communicating hole 16a formed at the other end of the pipe body 16, the rigidity of the pipe body 16 can be enhanced as compared with the conventional electromagnetic valve structure. Further, since the valve seat member 28, movable coil 30, return spring 31 and fixed core 17 can be mounted from the one end of the pipe body 16, the assembling capability of the electromagnetic valve can be improved.

FIG. 2C illustrates the case where tapered portions 19a and 19b are formed at the one end of the pipe body 16 to provide a concave groove so that the welding portion 19 on which the fixed core 17 is welded is formed in a thin-wall sectional shape reducing only the outerdiameter thereof. FIG. 2D illustrates the case where a concave (R-shape) portion is formed at the one end of the pipe body 16 so that the welding portion 19 on which the fixed core 17 is welded is formed in a thin-wall sectional shape reducing only the outer diameter thereof. Any case may be available as long as, of the portion to be inserted in the central hole 12a of the bobbin 12, the welding portion 19 on which the fixed core 17 is welded is formed in a thin-wall sectional shape reducing only the outer diameter thereof so that the difference $t$ in the outer diameter between the welding portion 19 and the inserted portion serves to absorb the height (swelling of the welded metal toward the outer periphery) of the bead.

Next, referring to FIG. 3, an explanation will be given of a schematic structure of the normally-opened electromagnetic valve IV. Incidentally, although for example, four normally-opened electromagnetic valves IV are installed in the modulator body (not shown), one of them will be explained below. The normally-opened electromagnetic valve IV includes a coil unit 43 with a coil winding 42 wound around a bobbin 41 and a valve operating unit 44 which closes the valve when the coil unit 43 is energized. The structure of the coil unit 43 is the same as that of the normally-closed electromagnetic valve. Therefore, the structure of the valve operating unit 44 will be mainly explained below.

A closed end cylinder (guide cylinder) 45 is press-fitted into an opening of the one end of the pipe body 16 and fixed from the outer periphery by welding. The guide cylinder 45 is inserted into the central hole 41a of the bobbin 41 of the coil unit 43. The other end of the fixed core 46 is fit in a fitting hole of a metallic modulator body (not shown). A seal ring 47 and cup seal 48 are fit over the outer periphery of the pipe body 16 in its longitudinal direction. In the fixed core 46 corresponding to the area axially partitioned by these seal ring 47 and cup seal 48, a communicating hole 49 is formed which communicates with a liquid path of the modulator body. A filter device 50 is fit over the communicating hole 49.

A movable core 52 made of magnetic substance is accommodated movably in the axial direction in the guide cylinder 45. A valve seat member 51 is fit in the fixed core 46 pressed into the opening of the guide cylinder. 45. A valve shaft 54 made of non-magnetic substance is mounted in the guide cylinder 45 in such a manner that a return spring 53 interposes between the valve shaft 54 and the valve seat member 51. A valve body (e.g. steel ball) is held at the tip of the valve shaft 54. The valve shaft 54 is urged so that its rear end is brought into contact with the movable core and hence the valve body 55 is always apart from the valve seat member 51, thereby opening the valve. When the coil unit 43 is energized, the movable core 52 is sucked toward the fixed core 46 to push the valve shaft 54 against the urging by the return spring 53 and to seat the valve body 55 on the valve seat member 51, thereby closing the valve.

Of the inserted portion of the guide cylinder 45 inserted in the central hole 41a of the bobbin 41, the welding portion 56 in which the fixed core 46 is press-fitted and welded is formed in a thin-wall sectional shape reducing only the outer diameter thereof. A difference $\underline{t}$ in the outer diameter between the welding portion 56 and the inserted portion serves to absorb the swelling of the bead due to welding. For this reason, the internal diameter of the bobbin 41 is not excessively increased taking the swelling of the bead into consideration, thereby down-sizing the coil unit 43 as compared with the conventional electromagnetic valve.

In accordance with the configurations described above, in the normally-closed electromagnetic valve OV and normally-opened electromagnetic valve IV, of the inserted portion of the pipe body 16 or the guide cylinder 45 with the one end inserted in the central hole 12a or 41a of the bobbin 12 or 41, the welding portion 19 or 56 in which the fixed core 17 or 46 is press-fitted and welded is formed in a thin-wall sectional shape reducing only the outerdiameter thereof. Therefore, a difference $\underline{t}$ in the outer diameter between the welding portion 19 or 56 and the inserted portion serves to absorb the swelling of the bead due to welding.

In this way, the welding potion 19 or 56 is formed in a thin-wall sectional shape reducing only the outer diameter thereof, so that the internal diameter of the bobbin 12 is not increased excessively, thereby down-sizing the coil unit 14 or 43 and hence electromagnetic valve.

Further, in the normally-closed electromagnetic valve OV, the bottom edge portion 16b is formed integrally to the other end of the pipe body 16 so that the rigidity of the pipe body 16 can be enhanced.

Further, since the valve seat member 28, movable coil 30, return spring 31 and fixed core 17 can be mounted from the one end of the pipe body 16, the assembling capability of the electromagnetic valve can be improved.

Although the preferred embodiments of this invention have been explained hitherto, this invention should not be limited to these embodiments, but many modifications can be made without departing from the sprit of the law. For example, the use of the electromagnetic valve is not limited to the electromagnetic deriving component for a motor vehicle. The sectional shape of the welding portion having a thin-wall formed in the cylinder may be optional.

In accordance with the constructions of the electromagnetic valves described in the first and fifth aspects, of the inserted portion of a pipe body with the one end inserted in the central hole of a bobbin, the welding portion in which the fixed core is press-fitted and welded is formed in a thin-wall sectional shape reducing only the outer diameter thereof, and a difference in the outer diameter between the welding portion and the inserted portion serves to absorb the swelling of a bead due to welding. For this reason, the inner diameter of the bobbin is not excessively increased as compared with the conventional electromagnetic valve so that the coil unit can be down-sized and hence the electromagnetic valve can be downsized.

Further, in accordance with the structures described in the second and third aspects, as compared with the conventional electromagnetic valve structure, the assembling capability of the electromagnetic valve can be improved since the valve seat member, movable coil, spring, fixed core, etc. can be mounted from the one end of the pipe body. In addition, since the bottom edge portion is integrally formed at the other end of the pipe body, the rigidity of the pipe body 16 can be enhanced.

What is claimed is:

1. An electromagnetic valve comprising:
    a coil unit including a bobbin around which a coil winding is wound, the bobbin having a central hole;
    a pipe body in which a fixed core is press-fitted and welded; and
    a valve operating unit with the pipe body inserted in the central hole of the bobbin at an one end thereof, a valve of the valve operating unit being opened or closed when the coil unit is energized,
    wherein, in an inserted portion of the pipe body opposed to the central hole of the bobbin, a welding portion in which said fixed core is welded is formed in a thin-wall sectional shape reduced only an outer diameter thereof, and
    a difference in the outer diameter between the welding portion and the inserted portion serves to absorb the swelling of a bead due to the welding.

2. The electromagnetic valve according to claim 1 further comprising:
    a movable core mounted in the pipe body in such a manner that a spring is interposed between the movable core and the fixed core, and including a valve body disposed at a tip of the movable core; and
    a valve seating member mounted in the other end of the pipe body,
    wherein the valve body is always seated at a valve seating member thereby closing the valve, and when the coil unit is energized, the movable core is sucked toward the fixed core against the urging by the spring, thereby opening the valve.

3. The electromagnetic valve according to claim 2, wherein a bottom edge portion is integrally formed at the other end of the pipe body against which the end of the valve seating member is hit.

4. The electromagnetic valve according to claim 1, wherein said pipe body including a top portion and mounting a movable core in vicinity of the top portion, the fixed core mounting a valve seating member and a valve shaft, the valve shaft including a valve body disposed at a tip thereof and disposed in such a manner that a spring is interposed between the valve shaft and the valve seating member, the rear end of the valve shaft is kept in contact with said movable core in such a manner that the valve body is always apart from the valve seating member, thereby opening the valve, and when the coil unit is energized, the movable core is sucked toward the fixed core so that the rear end of the valve shaft is pushed against the urging by the spring, thereby closing the valve.

5. The electromagnetic valve according to claim 1, wherein an inner diameter of the inserted portion of the pipe body is constant.

6. The electromagnetic valve according to claim 1, wherein the welding portion formed in the thin-wall sectional shape includes tapered portions so as to form a concave groove.

* * * * *

UNITED STATES PATENT AND TRADEMARK OFFICE
CERTIFICATE OF CORRECTION

| | |
|---|---|
| PATENT NO. | : 6,778,051 B2 |
| APPLICATION NO. | : 10/655299 |
| DATED | : August 17, 2004 |
| INVENTOR(S) | : Takaomi Shirase et al. |

It is certified that error appears in the above-identified patent and that said Letters Patent is hereby corrected as shown below:

Title page, Item (73), Assignee:
    Delete "Nissin Kogyo., Ltd." and Insert --Nissin Kogyo Co., Ltd.--

Signed and Sealed this

Nineteenth Day of February, 2008

JON W. DUDAS
*Director of the United States Patent and Trademark Office*